United States Patent [19]

Layer et al.

[11] Patent Number: 4,986,734
[45] Date of Patent: Jan. 22, 1991

[54] OVERSPEED PROTECTION SYSTEM FOR AIRCRAFT FAN ENGINE

[75] Inventors: John C. Layer, Caledonia; Jeffrey D. Metcalf, Albion, both of Ill.

[73] Assignee: Sundstrand Corporation, Rockford, Ill.

[21] Appl. No.: 263,360

[22] Filed: Oct. 27, 1988

[51] Int. Cl.⁵ .............................................. B63H 3/00
[52] U.S. Cl. .................................. 416/48; 416/50; 60/448
[58] Field of Search ................................ 416/46–50; 60/448

[56] References Cited

U.S. PATENT DOCUMENTS

| | | | |
|---|---|---|---|
| 2,664,960 | 1/1954 | Longfellow et al. | 416/49 X |
| 2,666,490 | 1/1954 | Richmond | 416/47 |
| 2,866,470 | 12/1958 | Hold et al. | |
| 2,888,806 | 6/1959 | Teumer | 60/448 |
| 2,931,177 | 4/1960 | Teumer | 60/448 |
| 2,937,888 | 5/1960 | Nichols | |
| 2,980,188 | 4/1961 | Allen et al. | 416/48 X |
| 3,003,566 | 10/1961 | Conn et al. | 416/49 X |
| 3,020,007 | 2/1962 | Hine | 416/48 X |
| 3,115,938 | 12/1963 | Fischer et al. | 416/48 |
| 3,387,663 | 6/1968 | Barnes et al. | 416/48 X |
| 3,523,419 | 8/1970 | Hindle | 60/448 |
| 3,999,386 | 12/1976 | Crull et al. | 60/423 |
| 4,533,296 | 8/1985 | Duchesneau et al. | 416/46 |
| 4,588,354 | 5/1986 | Duchesneau et al. | 416/27 |
| 4,645,420 | 2/1987 | Warner | 416/48 |
| 4,671,736 | 6/1987 | Finnigan | 416/46 |
| 4,711,615 | 12/1987 | Rusu | 416/46 |

FOREIGN PATENT DOCUMENTS 2187002  8/1987  United Kingdom ................. 60/448

Primary Examiner—Edward K. Look
Assistant Examiner—Hoang Nguyen
Attorney, Agent, or Firm—Wood, Phillips, Mason, Recktenwald & VanSanten

[57] ABSTRACT

An overspeed protection system for an aircraft fan engine wherein blades are rotatable from a coarse pitch to a fine pitch to a thrust-reverse condition. A wobbler-type hydraulic motor is provided for rotating the blade. An overspeed governor is operatively associated with the motor for effecting rotation of the blades in a direction toward the coarse pitch condition. A control, including a solenoid valve actuatable in thrust-reverse mode, changes the sense of the hydraulic motor to drive the motor further into thrust-reverse on actuation of the overspeed governor means.

9 Claims, 2 Drawing Sheets

OVERSPEED PROTECTION SYSTEM FOR AIRCRAFT FAN ENGINE

FIELD OF THE INVENTION

This invention generally relates to an engine overspeed protection system and, particularly, to such a system for an aircraft fan engine

BACKGROUND OF THE INVENTION

Aircraft fan engines present problems of avoiding an overspeed condition when the blades are in either a coarse pitch configuration or a fine pitch configuration. Heretofore, flyball governors might be employed for sensing an overspeed condition and rendering a signal to change the blade angles to prevent or counteract the condition.

For instance, a flyball governor might be employed to override a servo valve and effectively shuttle the valve which, in essence, changes the pressures to a hydraulic motor which controls the blade pitch. During normal operation of the aircraft engine, the blade pitch is in a zone sometimes called a "feather" region. This region is between the fine pitch and the coarse pitch condition of the blades for propelling the aircraft forward in normal operation. In other words, the speed of the engine is being controlled in the feather region of the blades between fine and coarse pitch condition. Should the engine overspeed in the feather region, the governor means would take over and effectively cause the blades to be rotated toward coarse pitch condition (i.e., more parallel to the air flow) to reduce the resistance and slow down the engine.

However, an overspeed condition also can occur in what is called the "thrust reverse" region of the blades, as when landing the aircraft. If a conventional governor system as described is employed, the system would be effective to rotate the blades first through their fine pitch condition before proceeding further to the coarse pitch condition. In essence, this has the affect of speeding the engine up before it can be slowed down. This would result in a more serious overspeed condition before the situation actually is rectified.

This invention is directed to providing a new and imroved overspeed protection system which avoids this problem by sensing the overspeed condition when in thrust-reverse mode and driving the blade motor means further into thrust-reverse on actuation by the governor means, thereby avoiding a situation of effecting a more serious overspeed condition.

SUMMARY OF THE INVENTION

An object, therefore, of the invention is to provide an overspeed protection system for an aircraft fan engine wherein blades are rotatable between a coarse pitch to a fine pitch to a thrust-reverse condition.

Generally, the overspeed protection system of this invention includes motor means for rotating the blades, and overspeed governor means operatively associated with the motor means for effecting rotation of the blades in a direction toward the coarse pitch condition when in normal operation. Control means are provided for changing the sense of the motor means when in the thrust-reverse condition to drive the motor further into thrust-reverse on actuation of the overspeed governor means.

More particularly, as shown herein, the motor means comprises a hydraulic motor, and valve means are provided for controlling displacement of the hydraulic motor. The overspeed governor means is coupled to the valve means for shuttling the valve means and controlling the motor in response to an overspeed condition sensed by the governor means. The control means include means for changing the sense of the motor by reversing the response of the motor to the control of the valve means. Specifically, the control means is effective to move the wobbler of the motor overcenter when the blades are in the thrust-reverse condition. This avoids the scenario described above wherein the blades otherwise would be rotated first through the fine pitch position, resulting in further overspeed, before rotating the blades to the coarse pitch position.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
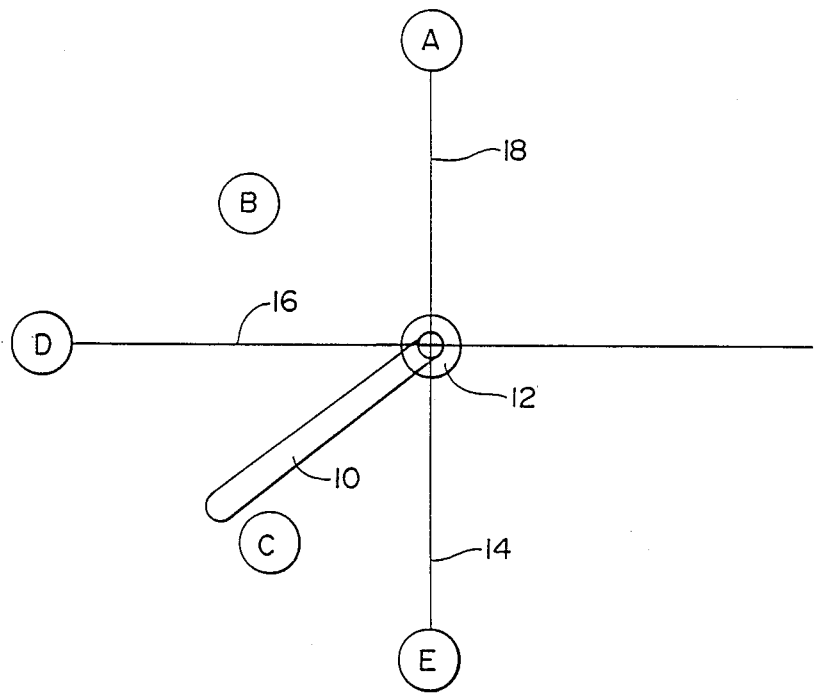
FIG. 1 is a diagram showing the regions of a propeller blade between a thrust-reverse region, through fine pitch and a feather region, to coarse pitch condition of the blades.

Referring to the drawings in greater detail, and first to FIG. 1, a diagram depicting the position of the propeller blades of an aircraft engine is illustrated. A blade 10 is mounted on a blade hub actuator 12 which rotates the blade and varies the pitch thereof with respect to air flow. Line 14 which terminates at "E" represents the engine centerline. Line 16 which terminates at "B" represents the fine position of the blade, and line 18 which terminates at "A" represents the coarse pitch position of the blade. Region "B" between lines 16 and 18 represents what is called the "feather" region of the blade wherein the speed of the engine actually is controlled to propel the aircraft forward. Region "C" between lines 14 and 16 represents the thrust-reverse region of the blade such as when the aircraft is landing and attempts are being made to rapidly slow down the aircraft.

In order to better understand the invention described hereinafter, it should be understood that a governor means is employed in any overspeed protection system to sense an overspeed condition and render a signal to the blade hub actuator. As shown herein and described hereinafter, a flyball governor might be employed. Therefore, when an engine overspeeds in the feather region "B", the flyball governor senses the overspeed condition and signals the blade hub actuator to rotate the blades toward coarse pitch "A". In other words, any time an overspeed condition exists between fine pitch "D" (line 16) and coarse pitch "A" (line 18), the blades simply are rotated more parallel to the air flow to lessen the resistance and thereby slow down the engine.

However, as can be understood graphically from FIG. 1, should an overspeed condition be sensed in thrust reverse region "C", the blades first are rotated through fine pitch position "D" before being rotated toward coarse pitch position "A". It readily can be understood that this actually results in a brief period of excessive overspeeding before the blades actually can be rotated from fine pitch "D" to coarse pitch "A" to slow down the engine.

Figure 2:
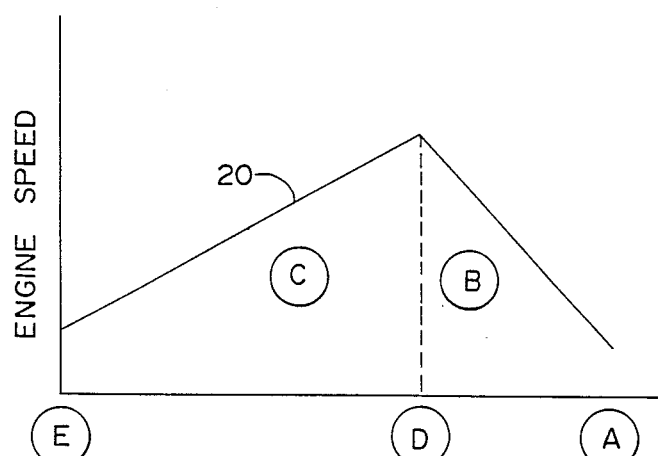
FIG. 2 is a graph showing the speed of the engine versus the position of the blades when moving through the regions diagrammatically depicted in FIG. 1.

This problem further is represented by the graph shown in FIG. 2. It can be seen that engine speed is charted in the vertical direction and blade positions "E", "D" and "A" are charted in the horizontal position. Also note the location of thrust reverse region "C" and feather region "B". It readily can be understood by graph line 20 that, should an overspeed condition exist in thrust reverse region "C", rotation of the blades actually increases engine speed from engine centerline "E" through fine pitch position "D" before the engine can be slowed down in the direction of coarse pitch position "A".

Figure 3:
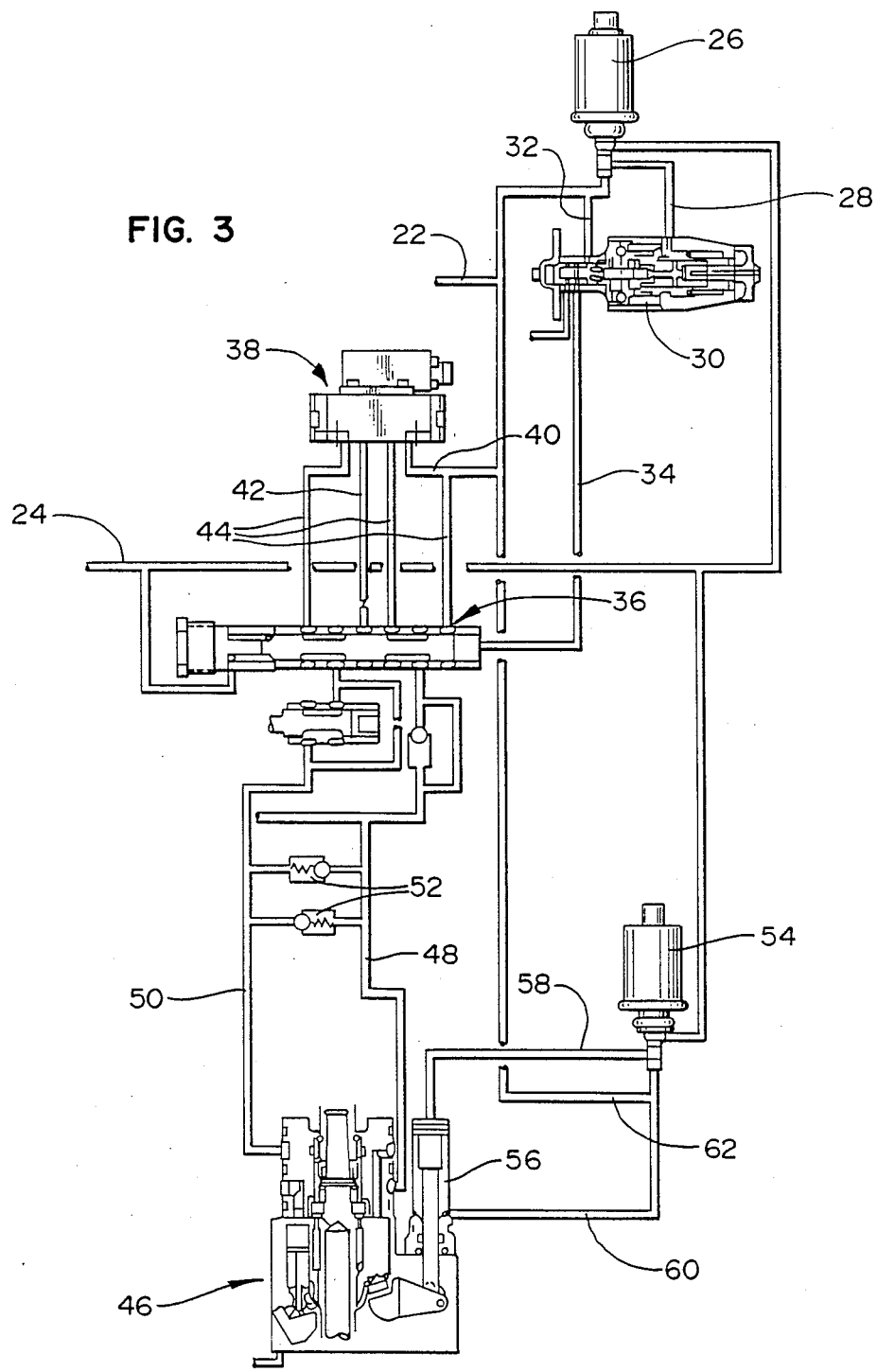
FIG. 3 is a hydraulic diagram of an overspeed protection system incorporating the concepts of the invention.

With the above understanding, FIG. 3 shows a hydraulic diagram of n overspeed protection system embodying the concepts of the invention which avoids having to rotate the blades through their fine pitch position when an overspeed condition occurs in the thrust-reverse mode. More particularly, a supply line 22 is connected to a source of pressure (e.g. 4500 psi). A return line from the system is shown at 24. Various components of the system simply are labeled because overspeed protection systems of this type are known and will not be described in great detail Suffice it to say, a normally off governor checkout solenoid 26 is in communication with supply 22 and return 24. The solenoid is coupled through line 28 to a flyball overspeed governor 30 of conventional construction. The governor is connected through line 32 to supply 22 and through a line 34 to an overspeed spool valve, generally designated 36. A servovalve, generally designated 38, is coupled to supply 22, as at 40, and to return 24, as at 42. Various other conduits 44 connect the servovalve at various positions along overspeed spool valve 26. A two displacement 46a over-center, wobbler-type hydraulic motor, generally designated 46, is coupled through lines 48 and 50 to various positions along the spool valve. The motor rotatable component of the shaft 46b is coupled to the blade hub actuator 12 for rotating the blades. As shown, line 48 is a coarse pitch line and line 50 is a fine pitch line. A pair of pressure relief valves 52 are coupled between lines 48 and 50.

With the general construction of the overspeed protection system described above, during a normal operation of the engine, i.e. in feather region "B" (FIGS. 1 and 2), an overspeed condition will be sensed by flyball governor 30. The governor, through line 34, will override servovalve 38 and effectively shuttle the spool of overspeed spool valve 36. In essence, governor 30 opens line 32 to line 34. The spool valve thereby is shuttled and changes the pressures to hydraulic motor 46. The blades thereby are driven in a direction from fine pitch position "D" to coarse pitch position "A" (FIGS. 1 and 2). Without the invention, this same direction of rotation of the blades would be effected in the same manner if an overspeed condition occurred in thrust reverse region "C".

The invention contemplates a thrust-reverse solenoid valve 54 coupled to a wobbler control piston 56 by means of a control line 58 and a pressure line 60 which is connected to supply 22 by a line 62. This solenoid can be electrically connected in any manner so as to be actuated when the engine is in its thrust-reverse mode, i.e. thrust-reverse region "C" (FIGS. 1 and 2), as when landing the aircraft. When so actuated, the solenoid moves wobbler control piston 56 to move the motor wobbler 46c over-center. In other words, during the thrust-reverse operation, the sense of the motor automatically is changed.

Now, with the motor sense changed, when flyball governor 30 senses an overspeed condition, the motor will drive the blades further into thrust reverse and slow down the engine. In essence, the blades would be rotated backwards along line 20 in the chart of FIG. 2 whereby it can be seen that the engine speed is slowed.

By using the graphical illustrations, in conjunction with the details of FIG. 3, it can be seen that the motor direction can be changed either by changing the direction of pressure in the supply and return lines and in coarse and fine pitch (lines 48 and 50, respectively), or by flipping the wobbler of motor 46. The invention actually is effective to do both, but in sequence. Changing the supply and return always will drive the blades from "D" toward "A", but the solenoid 54 "fools" the system and drives the blades toward "E" when in the thrust-reverse region "C". When in feather region "B", solenoid 54 will not be actuated and therefore the normal operation of rotating the blades from "D" to "A" will be effected when an overspeed condition is sensed.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. An overspeed protection system for an aircraft fan engine wherein blades are rotatable from a coarse pitch to a fine pitch to a thrust-reverse condition, comprising:
    a wobbler-type hydraulic motor means for rotating the blades;
    overspeed governor means operatively associated with the motor means for effecting rotation of the blades in a direction toward the coarse pitch condition; and
    control means for moving the wobbler of the hydraulic motor means over-center to thereby change the sense of the motor means when in the thrust-reverse condition to drive the motor further into thrust-reverse on actuation of the overspeed governor means.

2. The overspeed protection system of claim 1, including valve means for controlling the displacement of the hydraulic motor.

3. The overspeed protection system of claim 2 wherein said overspeed governor means is coupled to the valve means for shuttling the valve means and controlling the motor in response to an overspeed condition sensed by the governor means.

4. The overspeed protection system of claim 1 wherein said control means comprises a solenoid valve.

5. An overspeed protection system for an aircraft fan engine wherein blades are rotatable from a coarse pitch to a fine pitch to a thrust-reverse condition, comprising:
- a wobbler-type hydraulic motor means for rotating the blades;
- overspeed governor means operatively associated with the motor means for effecting rotation of the blades in a direction toward the coarse pitch condition; and
- control means including a solenoid valve actuatable in the thrust-reverse condition for moving the wobbler of the hydraulic motor means over-center to thereby change the sense of the motor means when the blades are in the thrust-reverse condition to drive the motor further into thrust-reverse on actuation of the overspeed governor means.

6. The overspeed protection of claim 5, including a wobbler control piston for moving the wobbler of the hydraulic motor means, and wherein said solenoid valve is hydraulically coupled to the wobbler control piston.

7. An overspeed protection system for an aircraft fan engine wherein blades are rotatable from a coarse pitch to a fine pitch to a thrust-reverse condition, comprising:
- a wobbler-type hydraulic motor means for rotating the blades;
- valve means for controlling the displacement of the hydraulic motor means;
- overspeed governor means coupled to the valve means for shuttling the valve means and control the motor in response to an overspeed condition sensed by the governor means to effect rotation of the blades in a direction toward the coarse pitch condition; and
- control means including a solenoid valve actuatable in the thrust-reverse condition for moving the wobbler of the hydraulic motor means over-center to thereby change the sense of the motor means when the blades are in the thrust-reverse condition to drive the motor further into thrust-reverse condition on actuation of the overspeed governor means.

8. The overspeed protection of claim 7, including a wobbler control piston for moving the wobbler of the hydraulic motor means, and wherein said solenoid valve is hydraulically coupled to the wobbler control piston.

9. An overspeed protection system for an aircraft fan engine wherein blades are rotatable in a feather range between a first forward coarse pitch condition and a fine pitch condition and, in a thrust-reverse range between said fine pitch condition and a second reverse course pitch condition, said system comprising:
- a wobbler-type hydraulic motor means for rotating the blades;
- overspeed governor means operatively associated with the motor means for effecting rotation of the blades in a direction toward the first coarse pitch condition with the blades operating in the feather range; and
- control means for moving the wobbler of the hydraulic motor means over-center to thereby change the sense of the motor with the blades in the thrust-reverse range to drive the motor further into thrust-reverse toward the second course condition on actuation of the overspeed governor means to thereby avoid having said blades realize an overspeed condition in transition through said feather range toward said first forward coarse pitch condition.

* * * * *